(12) United States Patent
Currie et al.

(10) Patent No.: US 6,533,520 B2
(45) Date of Patent: Mar. 18, 2003

(54) BALE LIFTER

(75) Inventors: Stephen Henry Currie, 134 Flaxmere Avenue, Flaxmere, Hastings (NZ); James Robert Currie, 16 Whitby Crescent, Flaxmere, Hastings (NZ)

(73) Assignees: Russell Henry Currie, Hastings (NZ); Stephen Henry Currie, Hastings (NZ); Valerie Kathryn Currie, Hastings (NZ); Denise Marjorie Currie, Hastings (NZ); Beryl Margaret Currie, Hastings (NZ); James Robert Currie, Hastings (NZ)

( * ) Notice: Subject to any disclaimer, the term of this patent is extended or adjusted under 35 U.S.C. 154(b) by 0 days.

(21) Appl. No.: 09/839,528

(22) Filed: Apr. 20, 2001

(65) Prior Publication Data

US 2002/0154969 A1 Oct. 24, 2002

(51) Int. Cl.$^7$ .................................................. B60P 1/48
(52) U.S. Cl. ..................... 414/24.5; 414/24.6; 414/111; 241/30
(58) Field of Search ............................... 414/24.5, 24.6, 414/920, 111; 241/30

(56) References Cited

U.S. PATENT DOCUMENTS

| | | | | |
|---|---|---|---|---|
| 4,088,272 A | * | 5/1978 | Grillot ................... | 241/101.76 |
| 4,090,624 A | * | 5/1978 | Krein et al. ................ | 172/501 |
| 4,431,357 A | * | 2/1984 | Butler .................. | 298/23 MD |
| 4,459,075 A | * | 7/1984 | Eichenberger ............. | 414/24.5 |
| 4,594,041 A | * | 6/1986 | Hostetler .................... | 242/557 |
| 4,952,111 A | * | 8/1990 | Callahan .................... | 414/111 |
| 4,971,504 A | * | 11/1990 | Klompien ................ | 280/415.1 |
| 4,982,658 A | * | 1/1991 | Knudson .................... | 100/100 |
| 5,150,999 A | * | 9/1992 | Dugan .................... | 414/24.5 |
| 5,211,345 A | * | 5/1993 | Siebenga ................. | 119/57.91 |
| 5,320,472 A | * | 6/1994 | Matlack et al. ............. | 414/111 |
| 6,171,046 B1 | * | 1/2001 | Nutcher ...................... | 414/24.5 |
| 6,171,047 B1 | * | 1/2001 | Vandervalk ................. | 414/111 |

* cited by examiner

Primary Examiner—Kathy Matecki
Assistant Examiner—Michael J. Kwon
(74) Attorney, Agent, or Firm—Merchant & Gould P.C.

(57) ABSTRACT

A bale lifter (5) suitable for lifting bales of hay etc. onto a vehicle (1). The bale lifter (5) includes a bale holder (6,7), the movement of which is prescribed by a transporting mechanism (9,12,15 and 18) so that a bale impaled by prongs (6) may be rotated onto the chassis (2) of a vehicle. When a bale (8) is just above the chassis (2) of a vehicle a release mechanism (16, 17 and 21) is actuated to allow the bale lifter (7) to rotate about a pivot point (11) to facilitate the removal of the prongs (6) from the bale.

9 Claims, 6 Drawing Sheets

BALE LIFTER

BACKGROUND OF THE INVENTION

The present invention relates to a bale lifter suitable for lifting bales of hay etc. onto a vehicle. The invention may find particular application in conjunction with a bale feeder.

Bales have traditionally been lifted onto bale feeders using forks that are slid underneath bales to lift the bales onto the bale feeders. In this case care must be taken not to spear the bale so that it catches on the forks.

Traditional bale feeders have been capable of feeding out only round bales. Modern bale feeders are now required to feed out both round and square bales. Lifting square bales using traditional forklifts is problematic as they pick up a certain amount of dirt in order to lift under the bale so that the prongs do not catch on the bale. Large forklift prongs having rounded ends have been used to avoid digging up dirt. However, the size of the prongs can make it difficult to pick up bales as they tend to push the bales rather than slide under them.

SUMMARY OF THE INVENTION

Square bales may be lifted using clamping or impaling techniques. Clamping mechanisms are expensive and complex. Impaling mechanisms available to date have also been complex and have suffered from the disadvantage of generating significant impact shocks when bales are dropped onto the bale feeders.

It is an object to the invention to provide a bale lifter which goes at least some way towards reducing these disadvantages or to at least provide the public with a useful choice.

There is this provided a bale lifter comprising:

a chassis;

a bale holder;

a transporting mechanism which rotates the bale holder with respect to the chassis so as to load a bale adjacent the chassis onto the chassis in use; and a release mechanism which activates when the bale holder is above the chassis to allow rotation of the bale holder with respect to the transporting mechanism to assist the release of a bale from the bale holder.

The transporting mechanism preferably comprises a first arm pivotally connected between a first pivot point on the chassis and a second pivot point on the bale holder, a second arm pivotally connected between a third pivot point on the chassis and a fourth pivot point on the bale holder and an actuator for rotating the arms with respect to the chassis and the bale holder with respect to the arms. The release mechanism is preferably in the form of a catch which is released when a bale is moved to a position just above the chassis.

BRIEF DESCRIPTION OF THE DRAWINGS

There is also provided a bale feeder incorporating a bale lifter as herein before described.

The invention will now be described by way of example with reference to the accompanying drawings in which:

Referring to FIG. 1 there is shown a bale feeder 1 having a chassis 2, a bale support 3 and a bale feeding mechanism 4 in the form of a plurality of rotating teeth. To the rear of the bale feeder 1 is provided a bale lifter 5 as shown in more detail in FIGS. 2 to 6.

In use prongs 6 of bale feeder 5 are impaled into a bale by driving the bale feeder towards a bale. The bale lifter 5 then transfers the bale to a position above the bale support 3 and prongs 6 are retracted from the bale.

Figure 1:
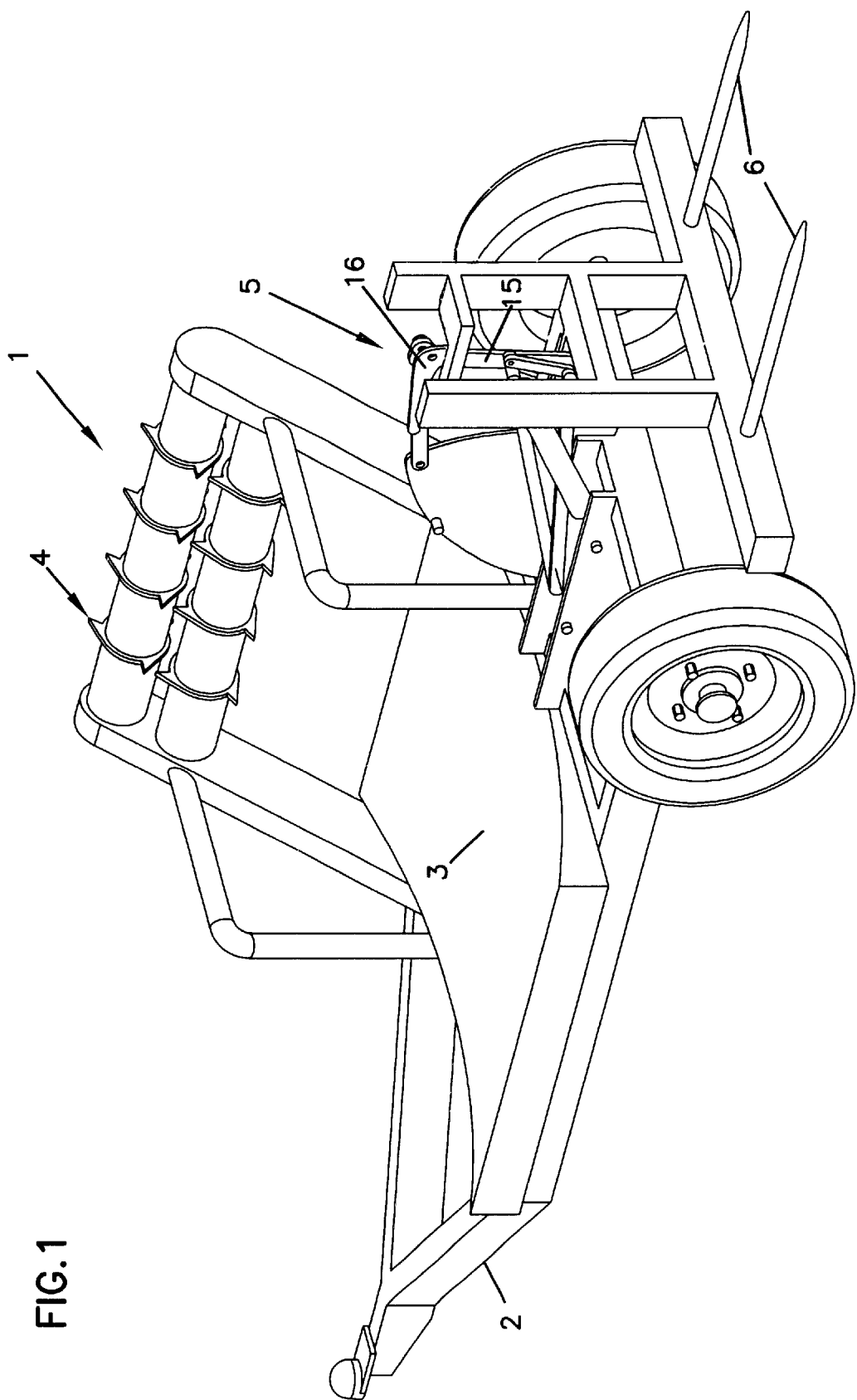
FIG. 1 is a perspective view of a bale feeder incorporating a bale lifter of the type of the present invention.
Figure 2:
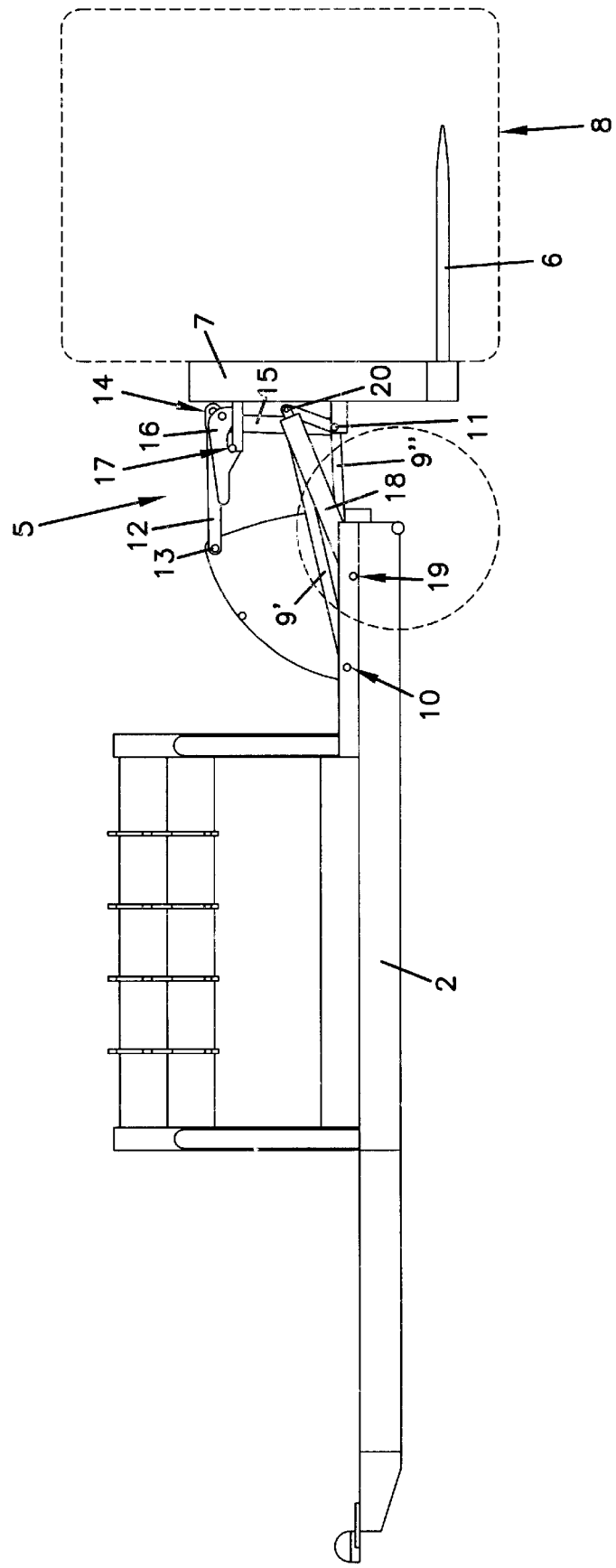
FIG. 2 is a schematic view of a bale lifter when its prongs have been impaled into a bale.

Referring now to FIGS. 2 to 6 the operation of the bale lifter will be described in greater detail. In FIG. 2 the bale lifter is shown in its lowered position when prongs 6 of bale holder 7 have impaled a bale 8. A first arm 9, composed of bar 9' and bar 9", is pivotally connected between a first pivot point 10 provided on chassis 2 and a second pivot point 11 provided on bale holder 7. A second arm 12 is pivotally connected between a third pivot point 13 and a fourth pivot point 14 connected to bar 15 which is also connected to second pivot point 11. Bale holder 7 is pivotally connected at second pivot point 11 and retained in connection with bar 15 via catch 16 which engages a latch 17 on bale holder 7. Although a transporting mechanism including arms 9 and 12 has been described it will be appreciated that although this arrangement is preferred that other transporting mechanisms could be employed.

To lift bale holder 7 ram 18 is extended. Ram 18 is an hydraulic ram that is pivotally connected to the chassis at pivot point 19 and first arm 9 at pivot point 20.

Figure 3:
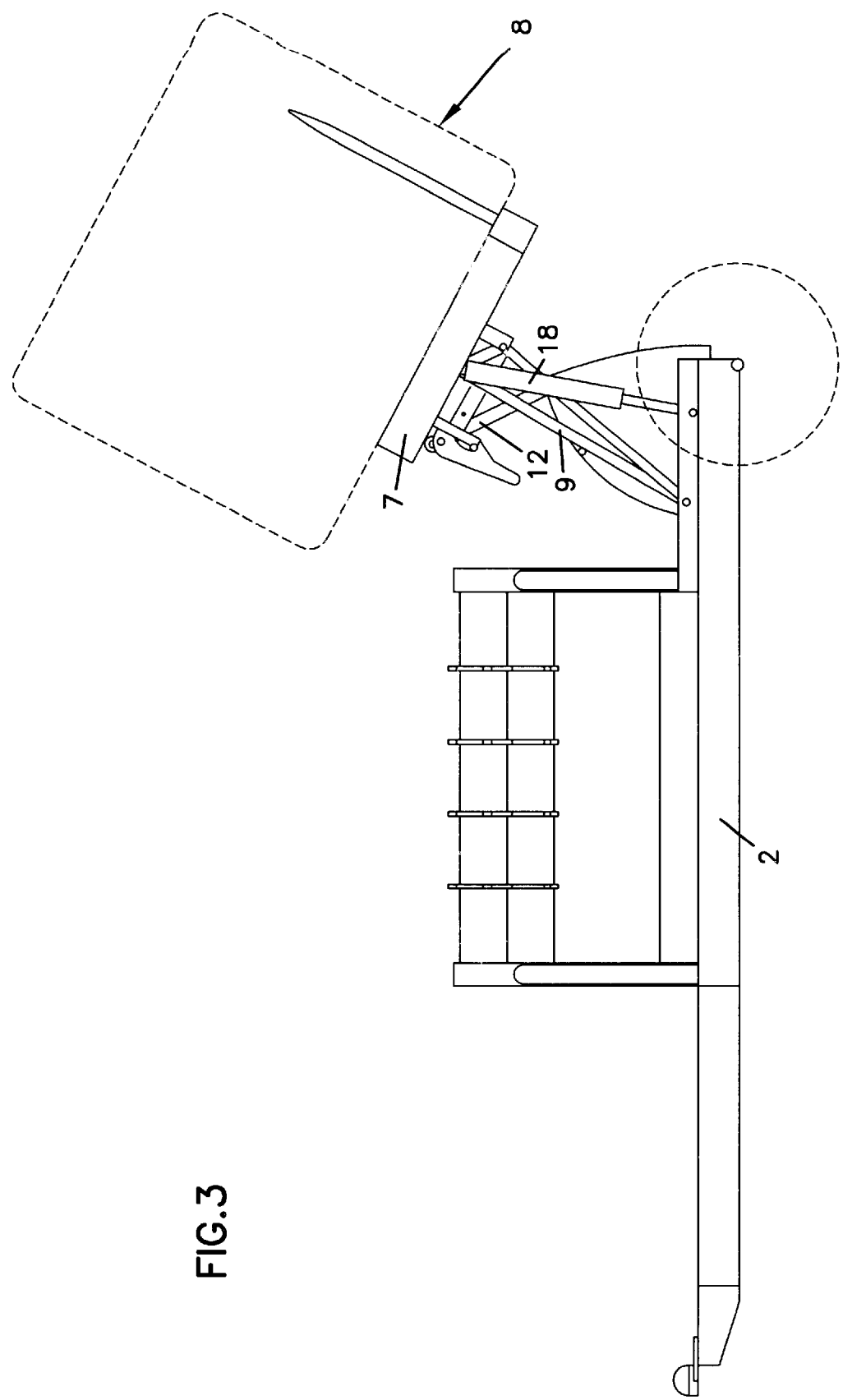
FIG. 3 shows the bale lifter of FIG. 2 when the bale has been partially lifted.

As shown in FIG. 3, as ram 18 extends the arrangement of the first and second arms 9 and 12 causes bale 8 to be lifted and bale holder 7 to be rotated.

Figure 4:
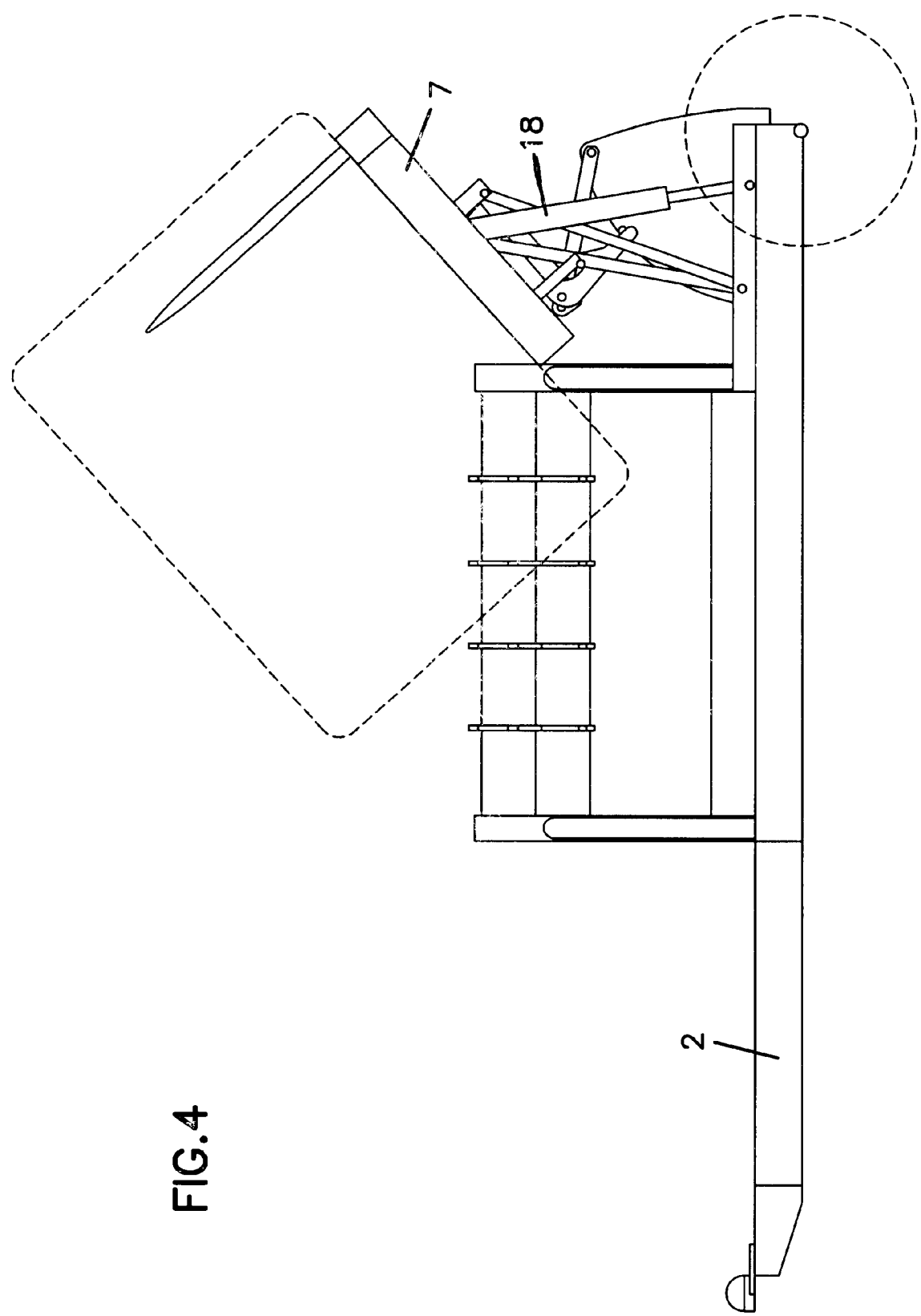
FIG. 4 shows the bale lifter of FIGS. 2 and 3 when the bale has been further lifted.

As shown in FIG. 4, as ram 18 is further extended bale holder 7 is further rotated to a position above chassis 2. It will be appreciated that this rotation is not pure rotation but a combination of rotation and translation.

Figure 5:
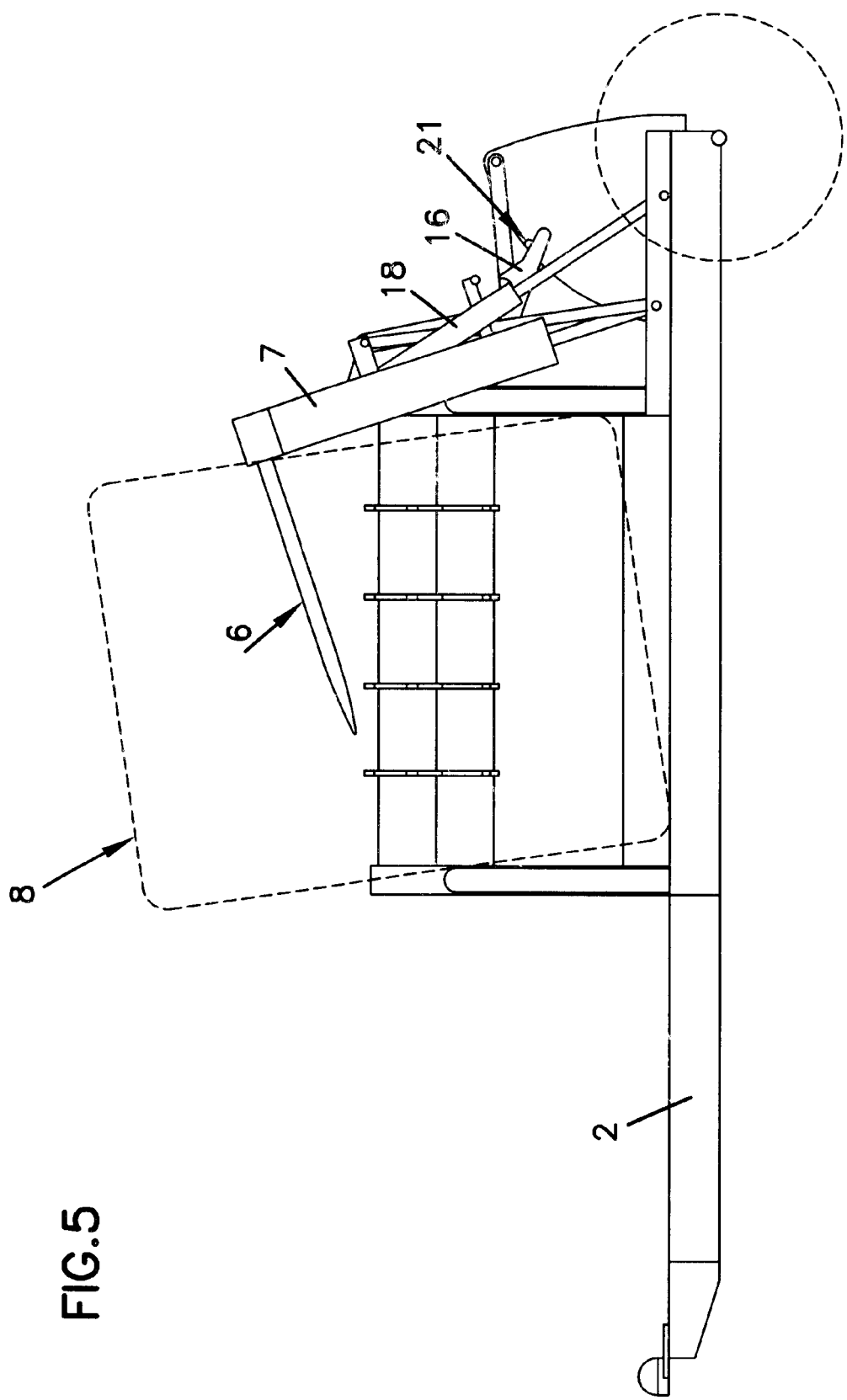
FIG. 5 shows the bale lifter of FIGS. 2 to 4 when a catch has been released allowing the bale to rotate.
Figure 6:
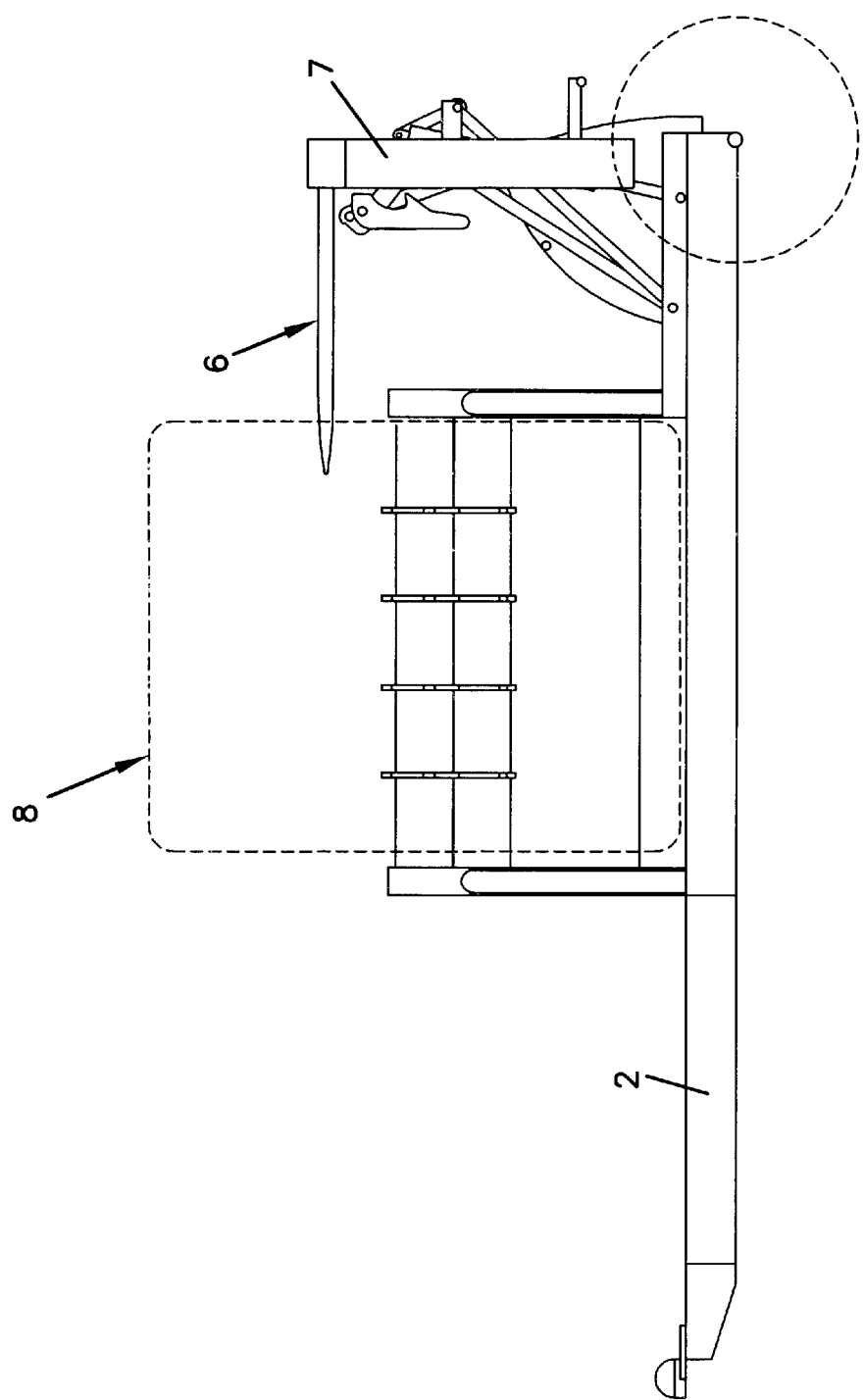
FIG. 6 shows the bale lifter of FIGS. 2 to 5 when the prongs have been removed from the bale.

Referring now to FIG. 5 ram 18 is further extended until bale 8 is positioned just above chassis 2. It will be seen that in this position a protrusion 21 engages with catch 16 and causes it to release so that bale holder 7 is free to rotate about second pivot point 11. Upon catch 16 being released bale holder 7 rotates about second pivot point 11 allowing the bale 8 to drop onto chassis 2. Typically bale 8 will only be at a height of 30 cm or less above chassis 2 when catch 16 is released and so minimal shock is applied to the chassis 2. Releasing catch 16 also facilitates the withdrawal of prongs 6 as illustrated in this and FIG. 6.

Once catch 16 is released hydraulic ram 18 is retracted and it draws bale holder 7 away from bale 8. Because catch 16 has been released there is minimal lateral force between the sides of the prongs and the bale and so the prongs 6 may be easily retracted to the position shown in FIG. 6. Once prongs 6 are fully retracted from bale 8, bale holder 7 is balanced so that it rotates back to the position shown in FIG. 2 and catch 16 engages with latch 17.

The height of prongs 6 may be adjusted by an operator prior to impaling a bale so that bales are speared at least 150 mm above ground. The height of prongs 6 above ground may be adjusted by extending ram 18 to adjust the height of prongs 6 according to the bale size being lifted.

The bale lifter of the invention is of simple construction, relatively inexpensive and enables easy handling of bales of any size and shape. The use of an impaling technique ensures bales are well retained during transportation. The impaling method also facilitates the removal of materials covering a bale. The bale lifter also provides an operator with the ability to control the lifting process at any stage and unload the bale at any stage before catch 16 is released.

What is claimed is:

1. A bale lifter comprising:
   a chassis;
   a bale holder;
   a transporting mechanism which rotates the bale holder with respect to the chassis so as to, in use, load a bale adjacent the chassis onto the chassis; and
   a release mechanism which activates when the bale holder is above the chassis to allow rotation of the bale holder with respect to the transporting mechanism to assist the release of a bale from the bale holder,
   wherein the release mechanism allows the bale holder to rotate about a pivotal connection between the transporting mechanism and the bale holder when released, and wherein the release mechanism is in a form of a catch which is urged to disengage from a latch when the bale holder has transported a bale to a position above the chassis.

2. A bale lifter as claimed in claim 1 wherein the transporting mechanism comprises: the first arm pivotally connected between a first pivot point on the chassis and a second pivot point on the bale holder, a second arm pivotally connected between a third pivot point on the chasses and a fourth pivot point on the bale holder; and an actuator for rotating the arms with respect to the chassis and rotating the bale holder with respect to the arms.

3. A bale lifter as claimed in claim 4 wherein the actuator is a hydraulic ram which moves the bale holder in the manner prescribed by the arms.

4. A bale lifter as claimed in claim 1 wherein the bale holder has prongs, the height of which above ground level may be adjusted in use.

5. A bale lifter comprising:
   a chassis;
   a bale holder;
   a transporting mechanism which rotates the bale holder from a rest position with respect to the chassis so as to, in use, load a bale adjacent the chassis onto the chassis; and
   a release mechanism which activates when the bale holder is above the chassis to allow rotation of the bale holder with respect to the transporting mechanism to assist the release of a bale from the bale holder, wherein the transporting mechanism comprises:
      a first arm pivotally connected between a first pivot point on the chassis and a second pivot point on a bar connected to the bale holder;
      a second pivot point on a bar connected to the bale holder;
      a second arm pivotally connected between a third pivot point on the chassis and a fourth pivot point on the bar connected to the bale holder; and
      an actuator for rotating the arms with respect to the chassis and rotating the bale holder with respect to the arms,
      wherein the first pivot point is located lower than the third pivot point on the chassis and the second pivot point is located lower than the fourth pivot point on the bar when the bale lifter is in the rest position, and
      wherein the bale holder is pivotally connected to the second pivot point and is releasably connected via the release mechanism to the bar extending between the second and fourth pivot points.

6. A bale lifter as claimed in claim 5 wherein the bale holder has prongs, the height of which above ground level may be adjusted in use.

7. A bale lifter as claimed in claim 5 wherein the actuator is a hydraulic ram which moves the bale holder in the manner prescribed by the arms.

8. A bale feeder comprising:
   a bale feeding mechanism; and
   a bale lifter positioned to release bales into the bale feeding mechanism, where the bale lifter comprises:
      a chassis;
      a bale holder;
      a transporting mechanism which rotates the bale holder with respect to the chassis so as to, in use, load a bale adjacent the chassis onto the chassis; and
      a release mechanism which activates when the bale holder is above the chassis to allow rotation of the bale holder with respect to the transporting mechanism to assist the release of a bale from the bale holder, and
      wherein the release mechanism allows the bale holder to rotate about a pivotal connection between the transporting mechanism and the bale holder when released and the release mechanism is in a form of a catch which is urged to disengage from a latch when the bale holder has transported a bale to a position above the chassis.

9. A bale feeder comprising:
   a bale feeder mechanism; and
   a bale lifter positioned to release bales into the bale feeding mechanism, where the bale lifter comprises:
      a chassis;
      a bale holder;
      a transporting mechanism which rotates the bale holder from a rest position with respect to the chassis so as to, in use, load a bale adjacent the chassis onto the chassis; and
      a release mechanism which activates when the bale holder is above the chassis to allow rotation of the bale holder with respect to the transporting mechanism to assist the release of a bale from the bale holder,
      wherein the transporting mechanism comprises:
         a first arm pivotally connected between a first pivot point on the chassis and a second pivot point on a bar connected to the bale holder;
         a second arm pivotally connected between a third pivot point on the chassis and a fourth pivot point on the bar connected to the bale holder; and
         an actuator for rotating the arms with respect to the chassis and rotating the bale holder with respect to the arms,
         wherein the first pivot point is located lower than the third pivot point on the chassis and the second pivot point is located lower than the fourth pivot point on the bar when the bale lifter is in the rest position, and
         wherein the bale holder is pivotally connected to the second pivot point and is releasably connected via the release mechanism to the bar extending between the second and fourth pivot points.

* * * * *